Feb. 10, 1931.  B. R. DYE ET AL  1,791,718
ANTIGLARE ATTACHMENT FOR VEHICLE HEADLIGHTS
Filed Aug. 27, 1929   2 Sheets-Sheet 1
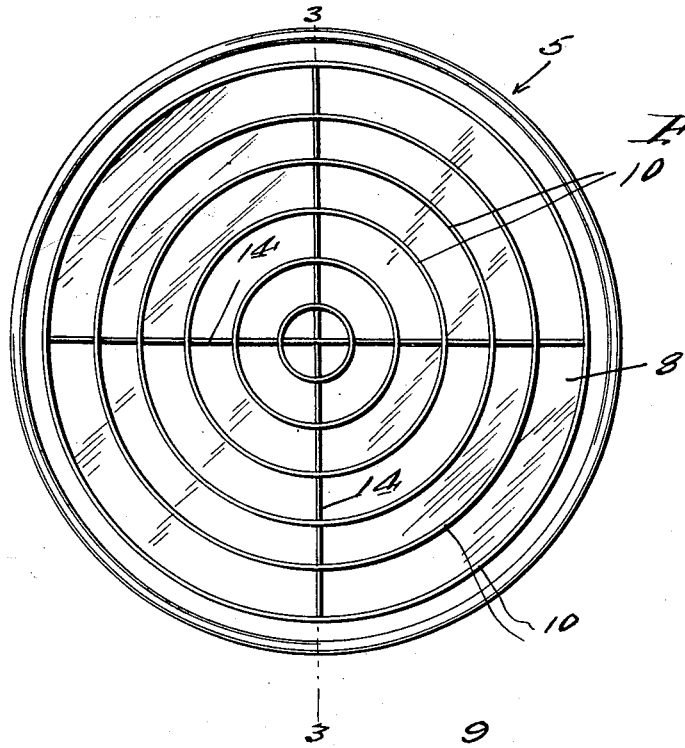
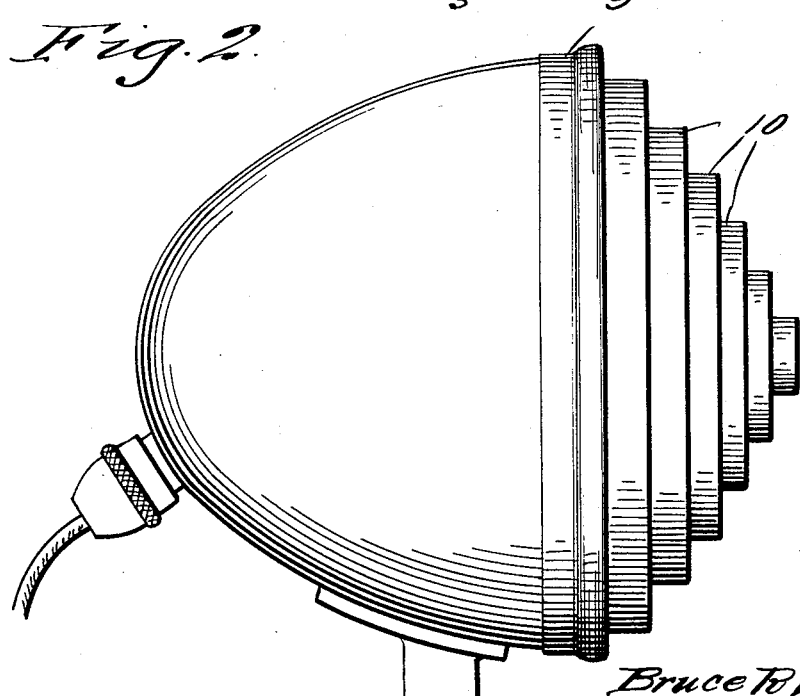
Inventor
Bruce R. Dye
Frank C. McDougall
By Clarence A. O'Brien
Attorney

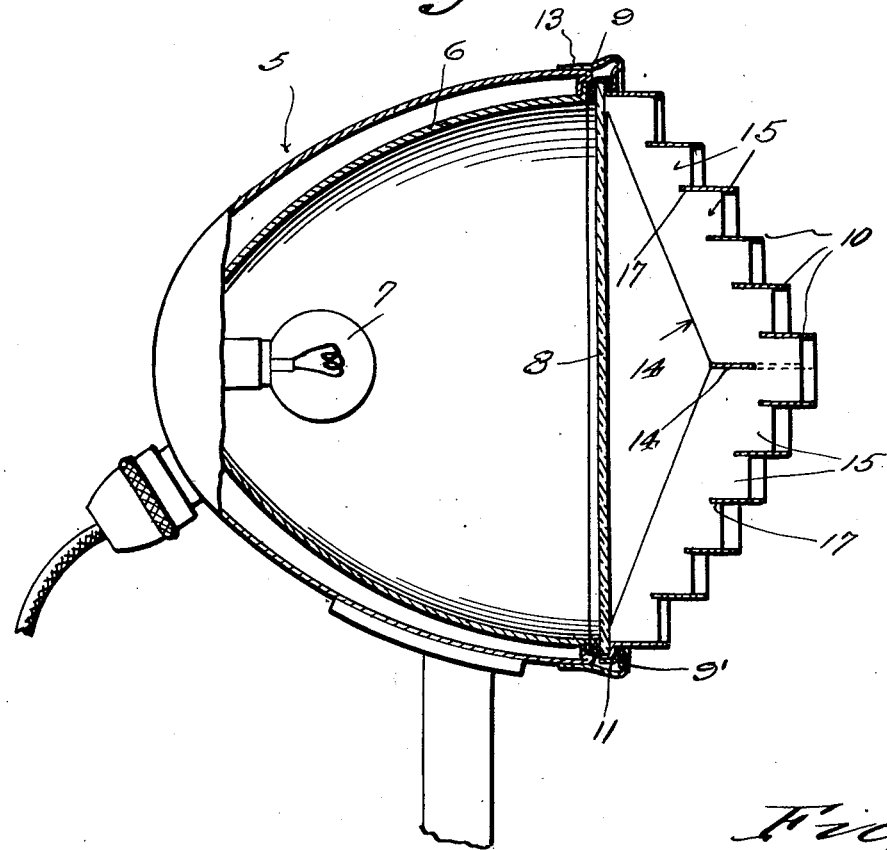
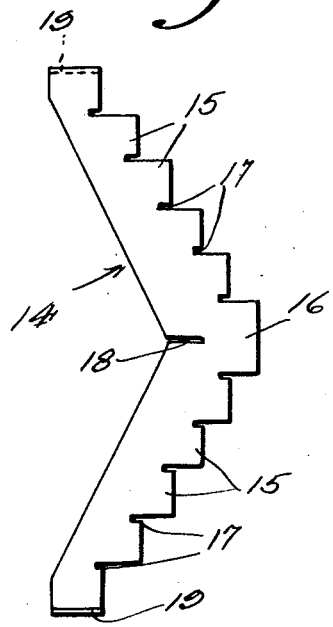
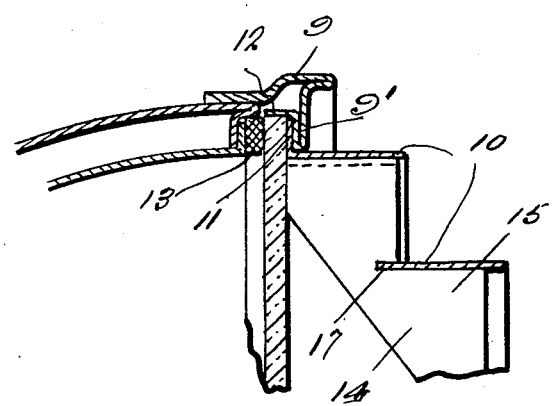
Inventor
Bruce R. Dye
Frank C. McDougall
By Clarence A. O'Brien
Attorney Patented Feb. 10, 1931

1,791,718

UNITED STATES PATENT OFFICE

BRUCE R. DYE AND FRANK C. McDOUGALL, OF BONNER SPRINGS, KANSAS

ANTIGLARE ATTACHMENT FOR VEHICLE HEADLIGHTS

Application filed August 27, 1929. Serial No. 388,723.

The present invention relates to an antiglare device for vehicle headlights, and has as its primary object the provision of a device capable of application to an automobile, aeroplane, or similar vehicle headlight which will give greater vision ahead of the vehicle, will reduce the glare of the headlights so as not to blind the operators of vehicles approaching from in front of the vehicle equipped with this device, thus promoting safe driving under the above-enumerated circumstances.

A still further object of the invention is to provide a device of this nature, which may be attached to the conventional headlight casing against the lens of the headlight to project forwardly from the lamp casing, said device comprising a plurality of concentric rings providing spaced apart deflecting surfaces to arrest objectional direct rays which would otherwise diverge widely directly in front of the headlight.

Other objects and advantages of the invention will become apparent during a study of the following description, taken in connection with the accompanying drawings, wherein:

Figure 1 is a front elevation of a headlight equipped with the anti-glare and fog eliminator device.

Figure 2 is a side elevation thereof.

Figure 3 is a longitudinal vertical sectional view.

Figure 4 is a side elevation of one of the ring spacing members.

Figure 5 is a fragmentary detail view partly in section and partly in elevation showing the manner of securing the ring and the ring spacing member to a headlight.

With reference more in detail to the drawings, it will be observed that the reference character 5 designates generally a lamp casing of conventional construction, 6 the parabolic reflector member which is also conventional and arranged in the casing in the usual well known manner.

The lamp bulb is designated generally by the reference character 7, the lens by the reference character 8, and the flanged lens retaining ring is designated as at 9. Such structure is conventional and is best shown and illustrated in detail in order that one may obtain a clear understanding of the application of the present invention.

The invention per se consists in a plurality of concentric reflecting bands or rings 10 adapted to be positioned around and forwardly of the lens 8, said bands or rings 10 being spaced apart from one another as clearly shown. The outer band or ring, which outer band or ring is of the greatest diameter, is provided on its inner edge with an outstanding peripheral flange 11. The flange 11 is adapted to be disposed against the outer face of the lamp lens 8 adjacent the peripheral flange 11. The flange 11 is adapted to be disposed against the outer face of the lamp lens 8 adjacent the peripheral edge of the rim as shown to advantage in Figure 5.

The lens retaining rim 9 has its vertical flange 9' disposed against the flange 11, the material of the band 9 forming the flange 9' is bent upon itself upwardly and then extended laterally as at 12 for rest upon the peripheral edge of the lens 8 and the said ring flange 11, as also shown to advantage in Figure 5. Rearwardly of the lens 8 and positioned between the lens and the outer flanged end of the parabolic reflector 6 is the usual packing ring 13. For maintaining the remaining bands or rings 10 spaced forwardly from the lens 8 and spaced from one another, we provide a pair of spacer members signated generally by the reference character 14.

The spacer members 14 are substantially of V-shaped configuration, and there are two of such spacer members 14, as illustrated to advantage in Figure 1. One of the spacer members 14 is disposed vertically and the other horizontally. Since the construction of both of the spacer members 14 are identical, it is believed that a detailed description of one will suffice.

Each of the said spacer members 14 are provided on their rearwardly extending outer edges with stepped projections 15. These stepped projections 15 recede rearwardly or toward the outer end of the members from the apex of the members. At its apex, the members 14 are provided with a relatively large step 16 between the adjacent steps, the members 14 are attached at 17. The members 14 are also provided at their apex with an inwardly extending notch or slit 18 which slit 18 extends inwardly from the rear edge of said members 14.

At their outer extremities, each of the members 14 are provided with oppositely extending lateral flanges 19—19.

In practice, one of the members 14 is disposed vertically and is positioned between the lens 8 and the rings, the projection 16 at the apex of the vertical member being received in the center or smallest of the rings 10, and this projection 16 extends diametrically of the ring, and is equal to the diameter of the ring, while the steps 15 project into the next adjacent rings, these projections 15 corresponding to the diameters of the rings, and the inner edges of the rings or bands 10 extend into the slits 17, as will be apparent from a study of Figure 3.

The second of the spacer members 14 is disposed horizontally, said horizontal and vertical members 14 being inter-connected with one another where they intersect at their apices, through the medium of the slots or slits 18 as is apparent. Of course, the distance from one end flange 19 to the other of the respective spacer members 14 is substantially equal to the diameter of the outer or flanged ring 10, which inner flanged ring is of course the largest of the rings, and the flanges 19 are disposed against the inner face of said ring as is also shown to advantage in Figure 3.

Therefore, it will be seen that the rings are maintained in concentric spaced relation and that the rings graduate in diameter from the apex to the extremities of the V-shaped spacer members.

The bands or rings 10 on their outer face may be of any color desired to correspond with the color of the lamp casing, but the inner faces of the rings or bands are preferably coated with a white paint or enamel so as to modify the light rays as they pass through the rings to issue therefrom.

It is believed that from a study of the foregoing description, taken in connection with the accompanying drawings, a clear understanding of the operation, construction, utility and advantages of a device of this nature will be had, and a more detailed description thereof is deemed unnecessary.

Even though we have herein shown and described the preferred embodiment of our invention, it is to be understood that the same is susceptible to changes fully comprehended by the spirit of the invention as herein described, and the scope of the appended claims.

Having thus described our invention, what we wish to claim is:

1. In a device of the class described, the combination with a conventional headlight and lens, of a substantially V-shaped member extending diametrically of the lens forwardly of said lens, the ends of said V-shaped member adapted for rest against one face of the lens at opposite diametrical points on the lens with the apex of said member being in spaced relation to said lens, and said member being provided on that edge farthest remote from the lens with a plurality of spaced projections, said projections receding inwardly from one another towards the ends of said member, and a plurality of bands positioned around said member, and said projections adapted to be disposed between adjacent bands for maintaining said bands in spaced relation.

2. A headlight having in combination, a pair of crossed spacing members, said members being connected together intermediate their ends, means provided on the outer ends of said members for engagement with the lens retaining ring of the headlight for securing said members forwardly of the headlight, a plurality of concentrically arranged bands, said spacing members respectively provided on one edge thereof with a plurality of spaced projections extending between adjacent bands for retaining said bands in spaced relation, and the projection of the respective members receding inwardly from one another toward the ends of said members.

In testimony whereof they affix their signatures.

BRUCE R. DYE.
FRANK C. McDOUGALL.